(12) United States Patent
Thompson (10) Patent No.: US 12,442,182 B2
(45) Date of Patent: Oct. 14, 2025

(54) NOISE BARRIERS AND METHODS OF THEIR MANUFACTURE

(71) Applicant: James G. Thompson, Columbus, OH (US)

(72) Inventor: James G. Thompson, Columbus, OH (US)

( * ) Notice: Subject to any disclaimer, the term of this patent is extended or adjusted under 35 U.S.C. 154(b) by 278 days.

(21) Appl. No.: 17/367,771

(22) Filed: Jul. 6, 2021

(65) Prior Publication Data

US 2022/0010549 A1     Jan. 13, 2022

Related U.S. Application Data

(60) Provisional application No. 63/049,976, filed on Jul. 9, 2020.

(51) Int. Cl.
     *E04B 1/86*          (2006.01)
     *B32B 3/08*          (2006.01)
         (Continued)

(52) U.S. Cl.
     CPC ................ *E04B 1/86* (2013.01); *B32B 3/08* (2013.01); *B32B 7/022* (2019.01); *B32B 7/023* (2019.01);
         (Continued)

(58) Field of Classification Search
     CPC ...... E04B 1/86; E04B 2001/8461; E04B 1/84; E04B 2001/8423; E04B 2001/327; E04B 2001/3276; B32B 3/08; B32B 7/022; B32B 7/023; B32B 13/06; B32B 15/18; B32B 33/00; B32B 2255/26; B32B 2262/101;
         (Continued)

(56) References Cited

U.S. PATENT DOCUMENTS

| 4,937,993 A | * | 7/1990 | Hitchins | ................. E04C 2/384 |
| | | | | 52/794.1 |
| 5,539,163 A | * | 7/1996 | Anderson | ............. E01F 8/0029 |
| | | | | 181/210 |

(Continued)

FOREIGN PATENT DOCUMENTS

| CN | 204266405 | 4/2015 |
| CN | 206233411 | 6/2017 |

(Continued)

OTHER PUBLICATIONS

Machine translation of JP-2003055919-A. Title: Method of Constructing Sound Insulating Wall. Inventor: Fujiwara et al. (Year: 2003).*

(Continued)

*Primary Examiner* — Dedei K Hammond
*Assistant Examiner* — Jennifer B. Olson
(74) *Attorney, Agent, or Firm* — Patterson Intellectual Property Law, P.C.; Samuel A. Raque (57) ABSTRACT

The present invention relates to a noise barrier wall panel that is lighter and more structurally sound than existing concrete noise barrier wall panels. The panel has a metal frame that is reinforced via metal strapping in key areas to prevent sagging. The panel has a plurality of layers forming a laminate that can be fixedly attached to the frame. A finish coating layer may have a plurality of designs, logos, symbols, or textures which may mimic building materials or scenery.

19 Claims, 10 Drawing Sheets

(51) Int. Cl.
  *B32B 7/022* (2019.01)
  *B32B 7/023* (2019.01)
  *B32B 13/06* (2006.01)
  *B32B 15/18* (2006.01)
  *B32B 33/00* (2006.01)
  *E01F 8/00* (2006.01)
  *E04B 1/84* (2006.01)

(52) U.S. Cl.
  CPC .............. *B32B 13/06* (2013.01); *B32B 15/18* (2013.01); *B32B 33/00* (2013.01); *E01F 8/0017* (2013.01); *B32B 2255/26* (2013.01); *B32B 2262/101* (2013.01); *B32B 2307/102* (2013.01); *B32B 2307/712* (2013.01); *B32B 2607/00* (2013.01); *E04B 2001/8461* (2013.01)

(58) Field of Classification Search
  CPC ........ B32B 2307/102; B32B 2307/712; B32B 2607/00; B32B 13/02; B32B 15/00; B32B 21/14; B32B 2255/20; B32B 2266/0278; B32B 2307/718; B32B 2307/7242; B32B 5/18; B32B 2266/025; B32B 13/00; B32B 2307/756; E01F 8/0017; E01F 8/00; E01F 8/0005; B44C 5/04; E04F 13/08; E04C 2/384; A47G 5/00
  USPC ....... 181/210, 284, 290, 285, 286, 287, 291, 181/294, 293, 288, 289
  See application file for complete search history.

(56) References Cited

U.S. PATENT DOCUMENTS

| | | | | |
|---|---|---|---|---|
| 6,288,163 | B1* | 9/2001 | Martin | C08L 83/04 |
| | | | | 524/588 |
| 7,837,007 | B2* | 11/2010 | Hotzeldt | B60R 13/0815 |
| | | | | 181/194 |
| 8,069,633 | B2* | 12/2011 | Tonyan | C04B 28/146 |
| | | | | 428/192 |
| 10,227,773 | B2* | 3/2019 | Radoane | E04F 13/04 |
| 10,676,923 | B2* | 6/2020 | Collins | E04B 1/34321 |
| 2007/0094963 | A1* | 5/2007 | McDonald | E04B 5/10 |
| | | | | 52/270 |
| 2014/0190229 | A1* | 7/2014 | Whaley | C23C 2/06 |
| | | | | 72/47 |
| 2015/0052838 | A1* | 2/2015 | Ritchie | E04C 3/29 |
| | | | | 156/331.7 |
| 2017/0067255 | A1* | 3/2017 | Serino | B32B 37/153 |
| 2021/0102349 | A1* | 4/2021 | Marandos | E01F 8/0017 |

FOREIGN PATENT DOCUMENTS

| | | | | |
|---|---|---|---|---|
| CN | 210238331 | | 4/2020 | |
| DE | 3043876 A1 * | | 9/1982 | |
| JP | 61-83743 | | 4/1986 | |
| JP | 2003055919 | | 2/2003 | |
| KR | 2011-0072141 | | 6/2011 | |
| WO | WO-2013010217 A1 * | | 1/2013 | ........... B32B 13/045 |
| WO | WO-2013049895 A1 * | | 4/2013 | ............... E04B 1/86 |

OTHER PUBLICATIONS

Machine Translation of Description of DE-3043876-A1 (Year: 1982).*
"TradeReady® Steel Joist." TradeReady® Steel Joist | ClarkDietrich Building Systems, www.clarkdietrich.com/products/tradeready-steel-joist#resources. Accessed Aug. 29, 2024. (Year: 2024).*
Search Report.

* cited by examiner

NOISE BARRIERS AND METHODS OF THEIR MANUFACTURE

CROSS-REFERENCE TO RELATED APPLICATION

The present application claims priority to, and the benefit of, U.S. Provisional Application No. 63/049,976, which was filed on Jul. 9, 2020 and is incorporated herein by reference in its entirety.

FIELD OF THE INVENTION

The present invention relates generally to the field of materials for noise barriers. More specifically, the present invention relates to an improved noise barrier wall panel that is lighter and more structurally sound than existing concrete noise barrier wall panels. The panel is comprised of a metal frame that is reinforced via metal strapping in key structural areas to prevent sagging, bending or warping. The panel also includes a plurality of layers that can be fixedly attached to the frame. The layers may include an insulation layer, at least one sheathing layer, an air and weather barrier layer, a covering coating layer, a basecoat and mesh layer and a finish coating or surface layer. Further, the finish coating or surface layer may have a plurality of designs, logos, symbols or textures, which may mimic building materials, aesthetic structural features or scenery. Accordingly, the present disclosure makes specific reference thereto. Nonetheless, it is to be appreciated that aspects of the present invention are also equally applicable to other like applications, devices and methods of manufacture.

BACKGROUND OF THE INVENTION

Noise produced by traveling vehicles, construction sites, playgrounds, athletic fields and the like can be extremely disturbing and unpleasant to nearby homes, businesses and other establishments that may border roadways, streets, highways, schools, industrial areas, etc. As a result, noise barrier walls are frequently installed between roadways, other noisy areas and neighboring homes or establishments to disrupt sound waves produced by roadway traffic, equipment or people using facilities and to prevent noise pollution from entering into other areas. Typical noise barrier walls may be constructed from earth, concrete, masonry, wood or metal.

Existing noise barriers walls are extremely heavy and are typically made of concrete. As a result, a significantly large number of deliveries are required to bring the prefabricated noise barrier wall panel sections to the construction site of the wall. In addition, concrete may crack or crumble over time and such cracking may in fact be precipitated by the sound waves emanating from the noise-generating areas. The high number of deliveries is mainly due to the weight of each panel section of the wall, which may weigh as much as eight tons or 16,000 lbs. As a result, only a small number of panels may be delivered at any one time typically using one semi-truck, which results in hundreds of deliveries via multiple trucks during construction of a typical noise barrier wall. A sound barrier may consists of around 500 individual 8 ft×24 ft panels. In addition, existing concrete noise barrier wall panels require heavy machinery to lift each panel into place while constructing a wall due to their weight. Further, due to the extreme length of each panel, noise barrier wall panels of existing designs are often prone to sagging near the middle portion of the panel.

Furthermore, existing concrete noise barrier walls are extremely limited in their design and appearance, which is a result of the workable nature and finishing capabilities of concrete. As such, existing noise barrier walls cannot typically be adorned with complex decorative icons, colors or be designed to mimic a wide variety of materials and textures which would make the panels more aesthetically appealing. Likewise, existing noise barrier walls are limited in their dimensions due to the structural workability of concrete and are often designed to prioritize structural loading over wind loading. As a result, existing noise barrier walls may be prone to damage during extremely high winds due to lack of proper reinforcement, as well as cracking due to the freezing and thawing of water that may seep into the concrete panels. Concrete panels may also deteriorate over time due to being exposed to high decibel levels which are found near sound generating areas such as roadways, construction sites and the like.

Therefore, there exists a long-felt need in the art for an improved noise barrier wall panel. There also exists in the art a long-felt need for an improved noise barrier wall panel that is less susceptible to sagging and structural weaknesses that occur in existing noise barrier walls. Further, there is a long-felt need in the art for a noise barrier wall panel that is lighter than existing noise barrier walls such that more panel sections can be transported in fewer trips when constructing a barrier wall. There is a need for a barrier wall material that would lend itself to a larger number of installation sites. Finally, there exists a long-felt need in the art for an improved noise barrier wall panel that can be adorned with a plurality of complex decorative icons/colors or can be designed to mimic a plurality of materials and textures.

The subject matter disclosed and claimed herein, in one embodiment thereof, comprises an improved noise barrier wall panel. The panel is comprised of a metal frame that includes metal strapping that reinforces the frame to prevent sagging and structural weakness. The panel also has a plurality of layers. The layers may include: an insulation layer, at least one sheathing layer, an air and weather barrier layer, a covering coating layer, a basecoat and mesh layer and a finish coating layer. Further, the finish coating layer may have a plurality of decorative finishes of differing colors, textures, images, logos, symbols, simulated architectural elements and features, etc.

In this manner, the improved barrier wall panel of the present invention accomplishes all of the forgoing objectives and provides an extremely lightweight barrier wall panel that does not contain concrete but does contain a plurality of structural or strapping members that reinforce the structure and prevent sagging. As a result, each panel is much lighter than conventional concrete panels, and therefore can be moved much easier with fewer delivery trips and without the need for heavy duty machinery. In addition, the panels are more readily adaptable to other areas which previously may have been unsuitable for heavy concrete panels. Further, the finish coating of the panel allows for the panel to be designed with any number of exterior finishes and designs that are otherwise unavailable to existing noise barrier walls of concrete construction.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises an improved noise barrier or sound reduction wall panel. The panel in one embodiment is comprised of a metal frame made from cold-formed steel. The frame includes a plurality of metal strapping that reinforces the frame at each corner, and diagonally through the middle or central section of the frame. As a result, the frame is prone to much less sagging (if any) and other structural weaknesses that exist in conventional concrete barrier wall panels. In a further embodiment of the frame, the frame may contain a door frame or window ports to allow for the installation of a door to allow for travel access through the wall or panel or to provide visibility as to what is occurring on the other side of the panel.

A plurality of layers can then be fixedly attached to the frame to form the panel. The first layer may include an insulation layer that has noise or sound decibel reducing properties. The next layer is a sheathing layer of cement board, which can be installed in sections to the frame. Cement board is a mixture of glass fibers and cement and forms a strong generally impact-resistant layer that can be cut into various sizes. A plurality of additional layers can then be installed on either side of the cement board sheathing layer. Additional layers may include an air and weather barrier layer, a covering coating layer, a basecoat and mesh layer and a finish coating or surface layer. Further, the finish coating or surface layer may have a plurality of decorative finish options such as differing colors, textures, images, logos, symbols, and architectural and other aesthetically appealing elements.

As a result, the improved noise barrier and sound reduction wall panel of the present invention is particularly advantageous as it does not contain traditional concrete. Therefore, the panel is far lighter in weight than existing concrete noise barrier wall panels. As such, a greater number of barrier wall panels can then be more easily transported in fewer trips to a building site and installed without the typical type of heavy-duty machinery required to install heavy concrete noise wall panels. Further, the finish layer of the panel allows the panel to be designed with a plurality of differing textures, material, colors, finishes, etc. that are not easily achievable with concrete noise barrier walls, due to the functional limitations of concrete and the requirement to produce multiple and expensive molds to create unique design elements for the panels.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved noise barrier wall panel that overcomes the limitations and inefficiencies of existing and conventional concrete noise or sound barrier wall panels. The enumerated inefficiencies of conventional panels include the unnecessarily heavy weight of concrete noise barrier wall panels, which make them difficult to transport efficiently. Another inefficiency includes the lack of variations in appearance and aesthetics of existing concrete noise barrier walls, which are limited by the workability of concrete and the available molds to impart different designs. Further, sagging that may occur within the barrier wall, particularly the central section, as a result of lack of reinforcement is yet a further inefficiency of existing concrete noise barrier wall panels. Therefore, an improved noise barrier wall panel is desired that overcomes said shortcomings and provides a lightweight, structurally sound and aesthetically-pleasing barrier wall.

The present invention, in one exemplary embodiment, is comprised of an improved noise or sound barrier wall panel that can be used to construct a noise or sound barrier wall. The panel in one embodiment includes a generally rectangular cold-formed steel frame which is sized and configured to meet a particular or desired dimension for a construction project. The frame further includes a plurality of metal strapping elements that are located in all corners of the frame, and also in diagonal locations that extend through the center of the frame. A plurality of layers can then be fixedly attached or otherwise secured to the frame and may be attached in a specific order via a particular method of assembly. One such combination of layers may include (in order of attachment to the frame) a noise-reducing insulation layer, at least one sheathing (e.g. cement board) layer which may be applied in various sections or regions of the wall panel, an air and weather barrier layer, a covering coating or surface layer, a basecoat and mesh layer and a finished coating layer. Further, the finished coating layer may have a plurality of raised decorative elements such as images, logos, symbols, architectural configurations and other aesthetically-pleasing features. In addition, the finished layer may take on a variety of textures and appearances that resemble materials such as brick, stone, wood, etc.

Figure 1:
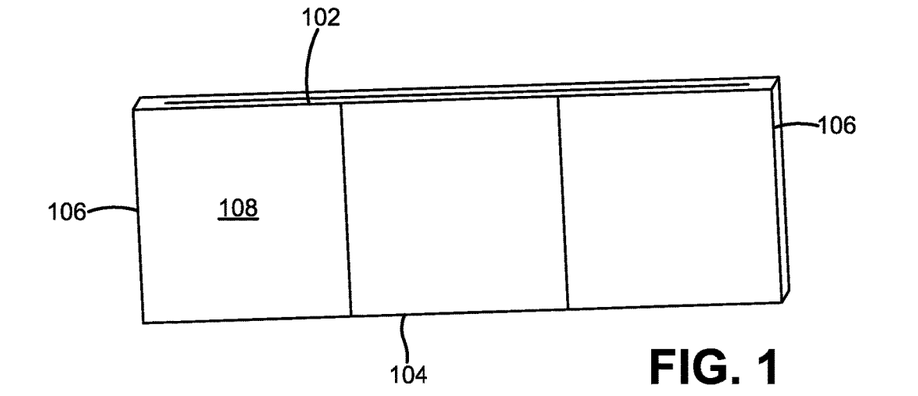
FIG. 1 illustrates a perspective view of one potential embodiment of a noise barrier wall panel of the present invention in accordance with the disclosed specification.

Referring initially to the figures, FIG. 1 illustrates a perspective view of one potential embodiment of a noise barrier or sound reduction wall panel 100 of the present invention in accordance with the disclosed specification. As will be more fully explained in detail below, the noise barrier or sound-reduction wall panel 100 is preferably made from a metal frame 120 and at least one layer of sheathing 142 is attached to the metal frame 120. The panel 100 may also have a plurality of additional layers above or over the sheathing layer 142, which includes but is not limited to: an air or weather barrier layer 146, a covering coating layer 148, a basecoat with a mesh finish layer 150 and an acrylic finishing coating layer 152. The coating or surface layer may include an anti-graffiti material such as a silicone or siloxane-based paint which forms a non-stick surface and repels paint and other unwanted coatings or debris.

The noise wall or sound reduction barrier panel 100 is also preferably lightweight. In certain embodiments, the panel 100 may weigh approximately 20 lb/ft$^2$ or less; and in other embodiments, about 8 lb/ft$^2$ or less. It is also contemplated that in differing embodiments the panel 100 may have a plurality of different dimensions allowing the panel 100 to be easily configurable to meet a particular job or application. However, the preferred dimensions are 8 ft×24 ft or 4 ft×24 ft for each panel 100. The preferred shape of each panel 100 is square or rectangular, such that each panel 100 has a top surface 102 and a generally parallel bottom surface 104, which is generally fully coextensive with the top panel, two generally parallel sidewalls 106, and a generally parallel front surface 108 and rear surface 110. However, in differing embodiments the panel 100 may differ in shape and may be any polygonal or geometric shape that is straight or curved.

In addition, other fanciful designs or configurations are of course possible in connection with the panel due to the particular make-up of the panel. It is also preferred but not required that in at least one embodiment, the panel 100 and all components are made of environmentally-friendly materials, including renewable and recyclable materials, such that the panel 100 may achieve LEED (Leadership in Energy and Environmental Design) certification.

Figure 2:
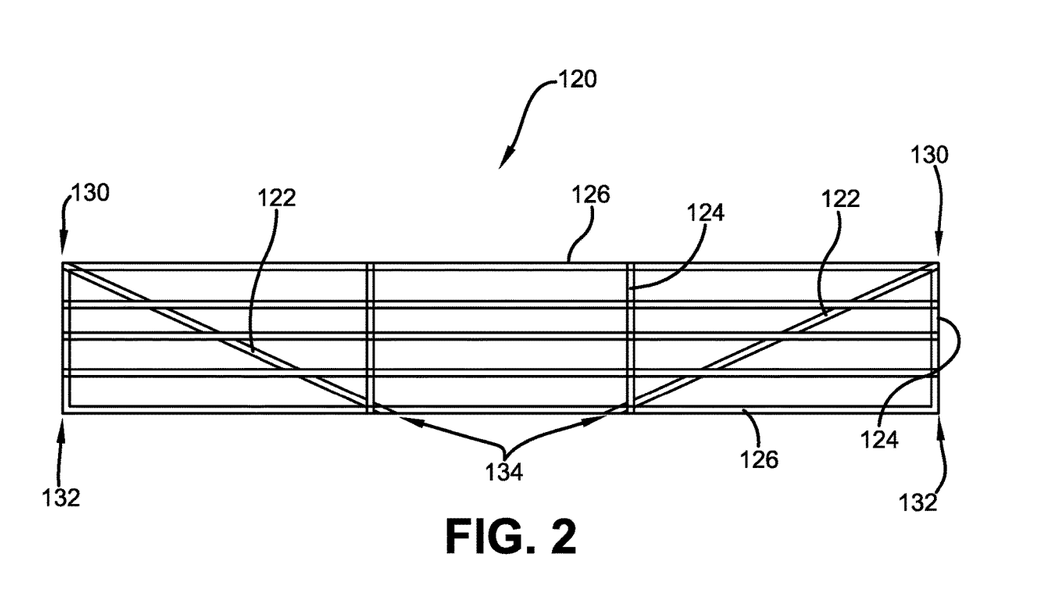
FIG. 2 illustrates a perspective view of one potential embodiment of a frame of a noise barrier wall panel of the present invention in accordance with the disclosed structure.

As seen in FIG. 2, the metal frame 120 of the panel 100 is preferably generally rectangular in shape. In differing embodiments, the frame 120 may be comprised of a plurality of cold-rolled or cold-formed metals, such that said metals meet any mechanical and chemical requirements that are standard to the industry (e.g., ASTM 1003). In one embodiment of the panel 100, the frame 120 may have a G60-G90 galvanized cold-rolled metal components that are screwed, fastened, adhered or welded together to form the frame. It is further contemplated that the frame can also be made up of any number and combination of the following components: (a) 6"-14 Gauge Studs at no less than 9¼" on center with no less than G60 Coating (b) a 6¼"×6¼" (approx.)—14 Gauge End Track (c) 2" wide×16 Gauge cold rolled Strapping (d) 6"—18 Gauge Studs with no less than G60 coating (e) 6"—14 Gauge Lifting Stud with 3" diameter hole punch that allows for the lifting of the panel (f) 4⅝"×7"×⅜" Bearing Plate Galvanized per CMS 711.02 (g) 4"—18 Gauge Stud to act as a keyway for the stud above.

Figure 4:
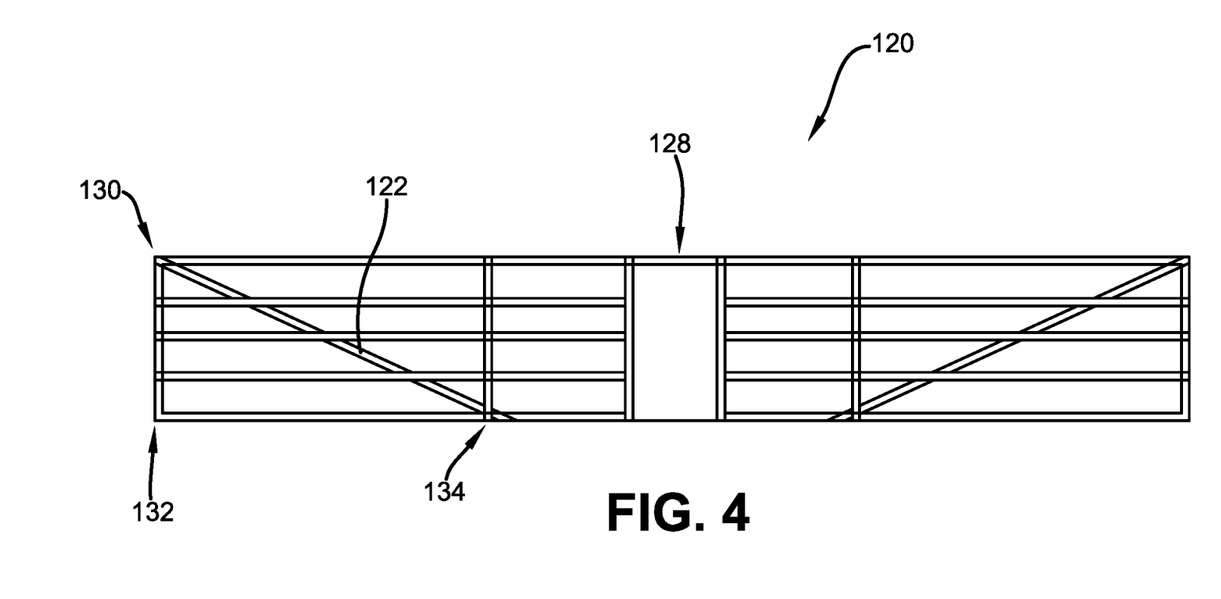
FIG. 4 depicts a perspective view of another potential embodiment of a frame of a noise barrier wall panel of the present invention in accordance with the disclosed specification.
Figure 7:
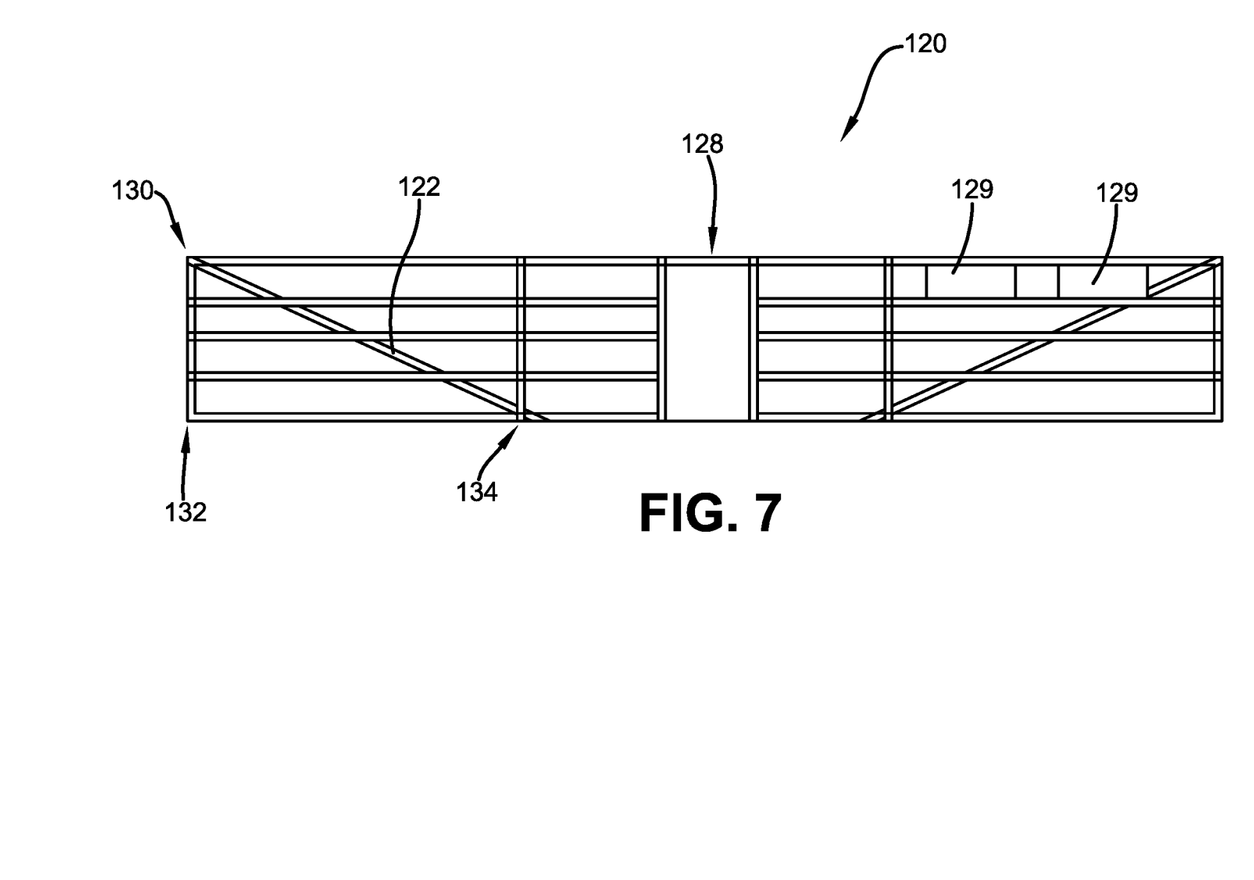
FIG. 7 shows a further potential embodiment of a noise or sound barrier panel as disclosed in the present invention.
Figure 8:
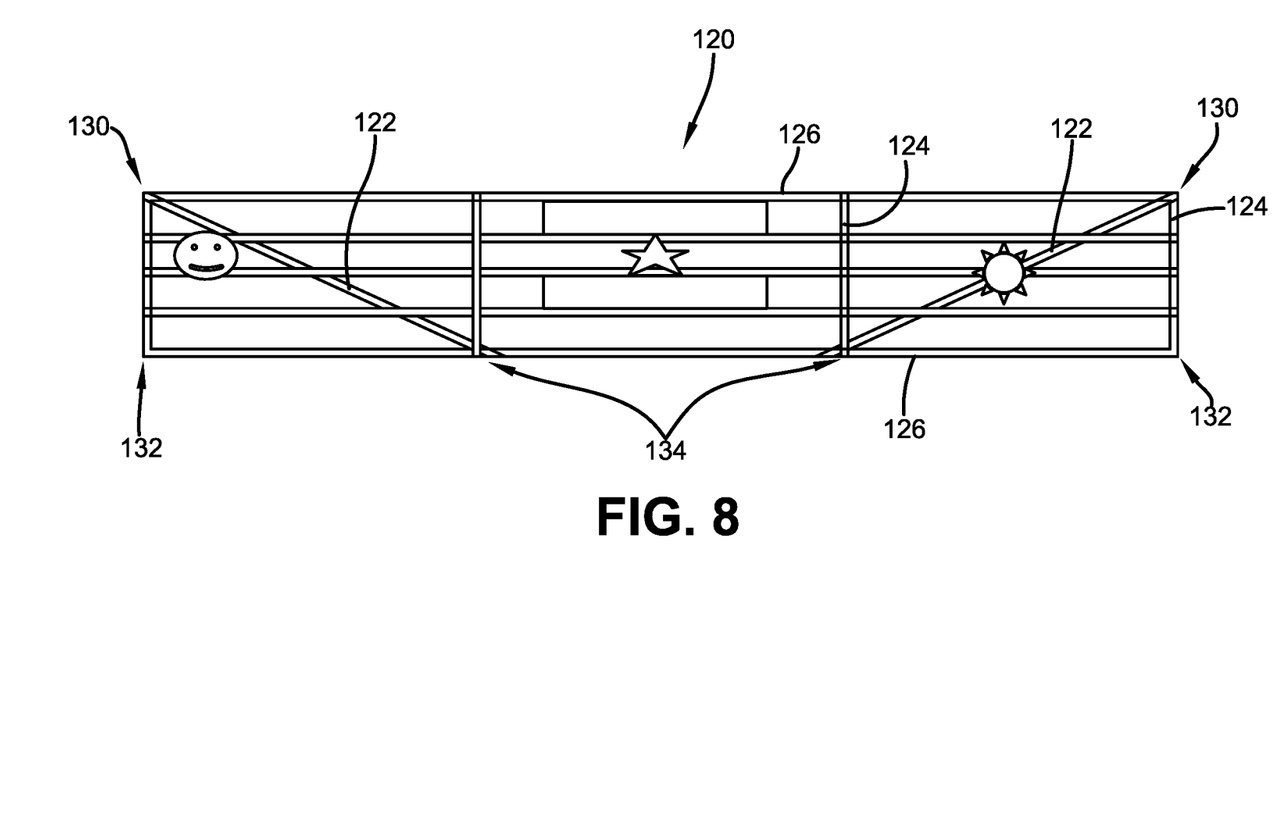
FIG. 8 is a still further potential embodiment of a noise or sound barrier having different aesthetic or architectural elements.

It is further contemplated that said materials may be used to make up any number or combination of the vertical frame members 124 and horizontal frame members 126 of the frame 120. Further, an additional embodiment of the panel 100 may include an access door frame 128 or window 129 (see FIG. 7) within the panel 100 that can be used to attach an access door or window within the panel 100, as seen in FIG. 4 (and FIG. 7, respectively). Accordingly, the access door can be used to allow individuals to travel through the panel 100 or wall for maintenance or convenience purposes, and windows can be used to view activity on the other side of the wall as well as to check to see if it is safe to open the door and cross beyond the panel.

Figures 3A, 3B:
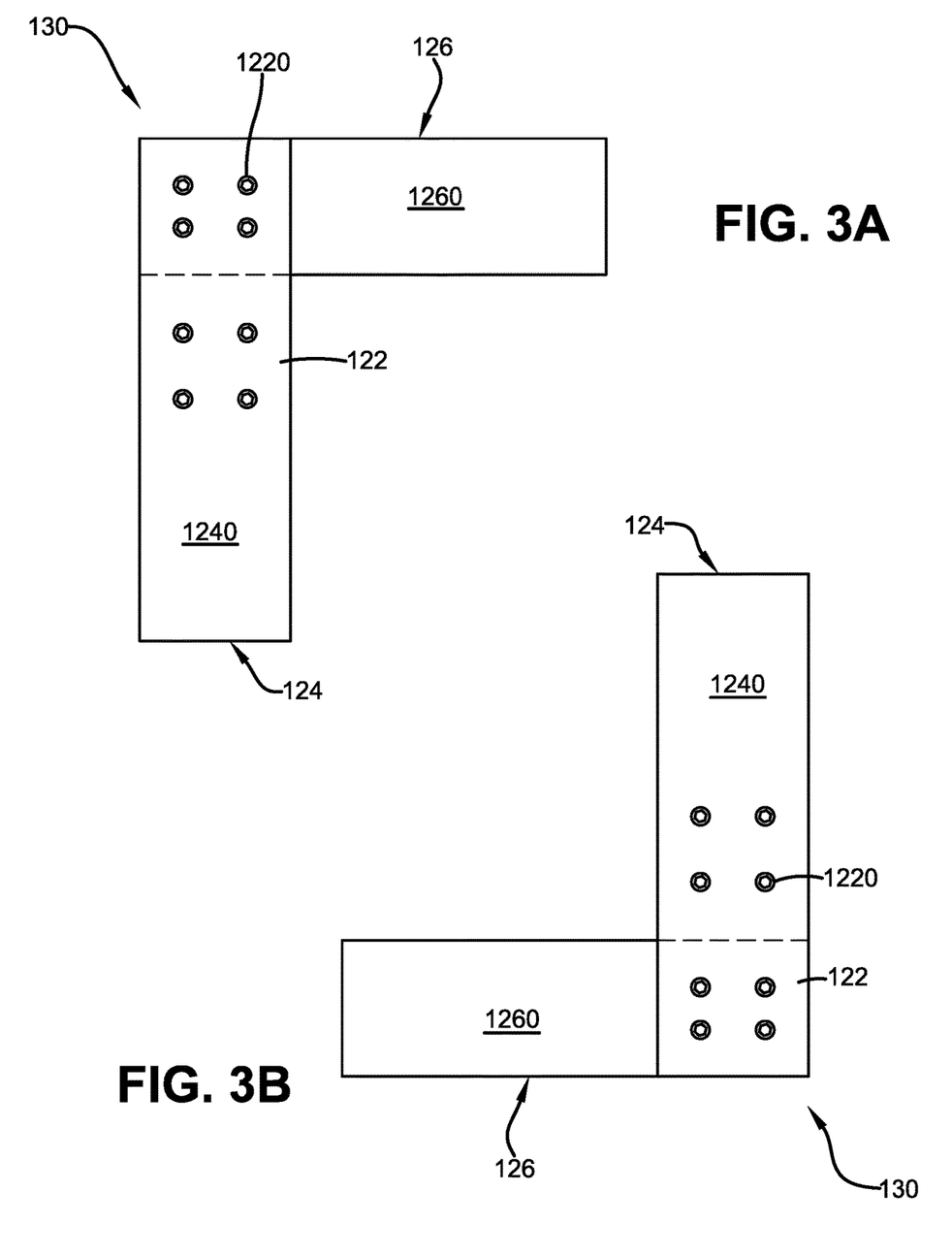
FIG. 3A provides an enhanced perspective view of one potential embodiment of strapping connection of the top corner of a frame of a noise barrier wall panel of the present invention in accordance with the disclosed description.
FIG. 3B shows an enhanced perspective view of one potential embodiment of strapping connection of the bottom corner of a frame of a noise barrier wall panel of the present invention in accordance with the disclosed specification.
Figure 3C:
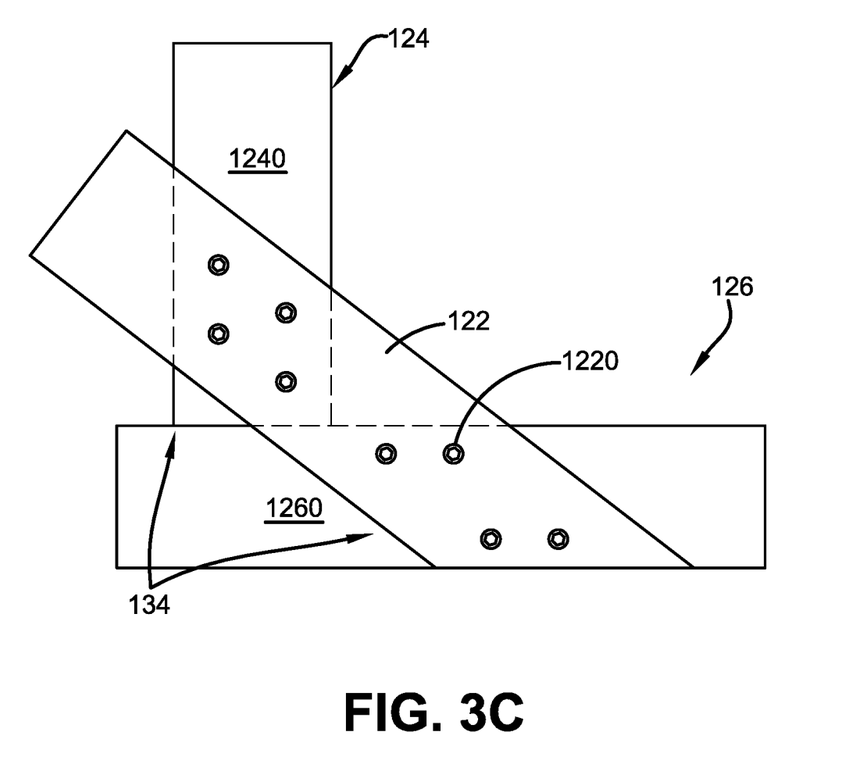
FIG. 3C displays an enhanced perspective view of one potential embodiment of strapping connection of a diagonal intersection of a frame of a noise barrier wall panel of the present invention in accordance with the disclosed framework.

Each panel 100 may have a plurality of strapping elements 122, which may be made of any of the materials listed supra. The strapping elements 122 further improve the strength of the panel 100 and prevents sagging and structural weakening from structural, stress, vibrational or wind loads. The strapping 122 is preferably removably attached via fasteners 1220 or fixedly attached via welding to the frame 120 before the application of sheathing 142. As shown in FIG. 3A, FIG. 3B, and FIG. 3C, the strapping 122 can be located in a plurality of locations within each panel 100. The locations may include the top corners 130, bottom corners 132, and diagonal intersections 134 of all or some areas of the frame 120.

FIG. 3A illustrates an enhanced perspective view of one potential embodiment of the strapping 122 connection used for the top corner of a frame 120 of a noise barrier wall panel 100 of the present invention in accordance with the disclosed framework. It is contemplated that in this area of the frame 120, the strapping 122 is fastened to the front surface 1240 of the vertical frame member 124 and to the front surface 1260 of the horizontal frame member 126 via fasteners 1220 such as bolts. However, in a differing embodiment of the panel 100, the strapping 122 may be fixedly attached (e.g. welded) or removably attached to each surface 1240, 1260.

FIG. 3B illustrates an enhanced perspective view of one potential embodiment of strapping 122 connection of the bottom corner 132 of a frame 120 of a noise barrier wall panel 100 of the present invention in accordance with the disclosed specification. It is contemplated that in this area of the frame 120, the strapping 122 is fastened to the front surface 1240 of the vertical frame member 124 and to the front surface 1260 of the horizontal frame member 126 via fasteners 1220 such as bolts or screws. However, in a differing embodiment of the panel 100, the strapping 122 may be fixedly attached (e.g. welded) to each surface or layer 1240, 1260 as needed to create a secure structure.

FIG. 3C illustrates an enhanced perspective view of one potential embodiment of strapping 122 connection of a diagonal intersection 134 of a frame 120 of a noise or sound barrier wall panel 100 of the present invention in accordance with the disclosed description. It is contemplated that in this area of the frame 120, the strapping 122 is fastened or otherwise secured to the front surface 1240 of the vertical frame member 124 and to the front surface 1260 of the horizontal frame member 126 via fasteners 1220 such as bolts, screws or other mechanical fasteners. However, in a differing embodiment of the panel 100, the strapping 122 may be fixedly attached (e.g. welded) to each surface 1240, 1260. This fastening may also occur in embodiments of the panel 100 that feature diagonal strapping 122, wherever the strapping 122 may contact any vertical frame member 124 and/or any horizontal frame member 126 within the frame 120.

As seen in FIG. 4, a plurality of sheathing 142 layers is then attached to one or both surfaces 108, 110 of the metal frame 120 to form a first layer. However, in one embodiment of the panel 100, insulation 140 may be used as a base layer to which the sheathing 142 is applied. This sheathing 142 attachment process can be done by using any suitable type of screws (ex. cement board coated screws) and at any suitable amount of spacing. It is further contemplated that in the preferred embodiment of the panel 100, the sheathing 142 is comprised of 0.5 in. cement board, which is a composite of glass fibers and cement and can be cut relatively easily and formed into different shapes or configurations as needed. However, in differing embodiments of the panel 100 the sheathing 142 may differ in thickness as well as material type and may also include, but is not limited to: synthetic stucco or an exterior insulation and finish system (EIFS). As also noted above, one panel 100 may contain any number of sheathing 142 layers, with the lowest number of layers being at least one layer.

Figure 5:
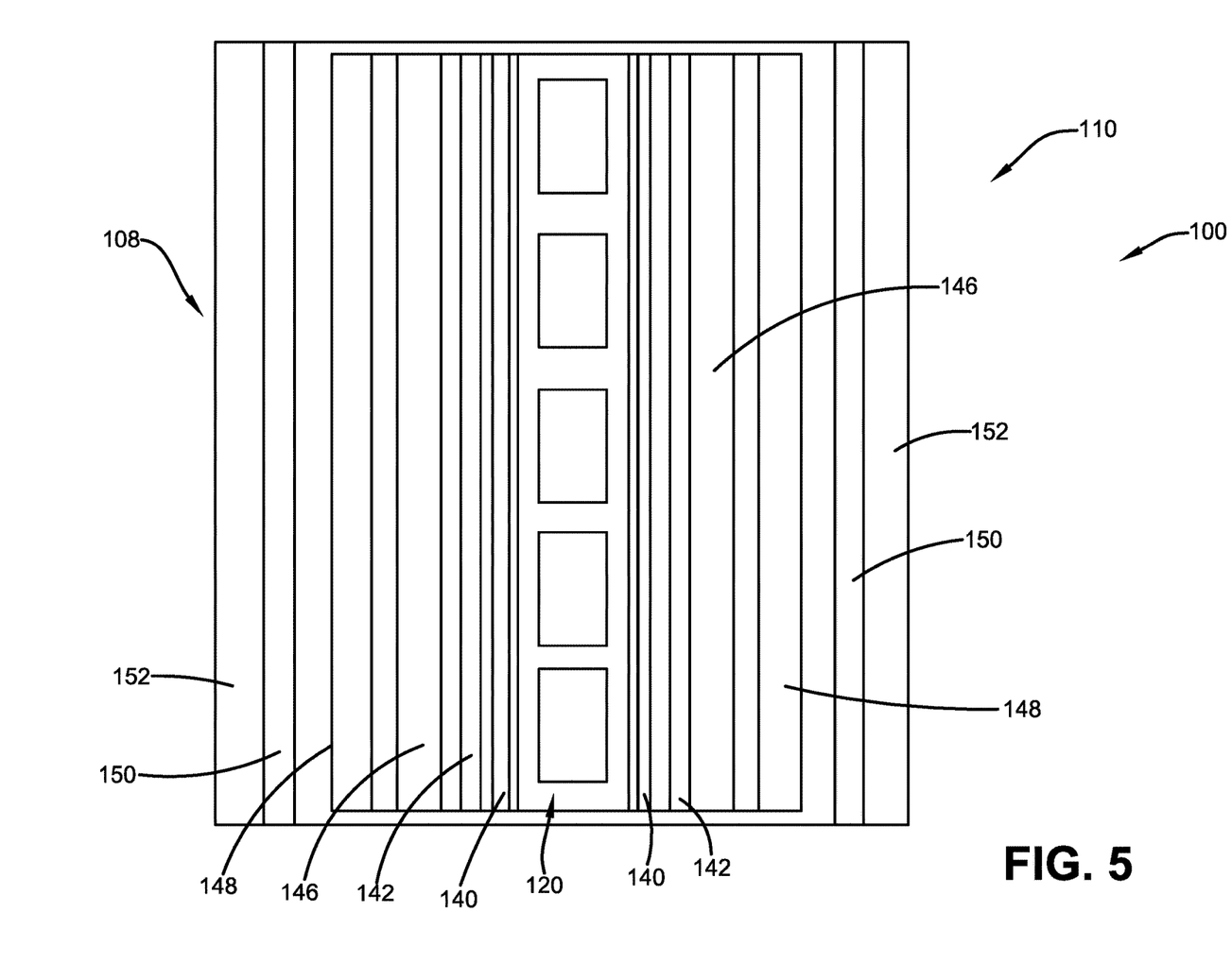
FIG. 5 illustrates a cross-sectional view of one potential embodiment of a noise barrier wall panel of the present invention in accordance with the disclosed structure.
Figure 6:
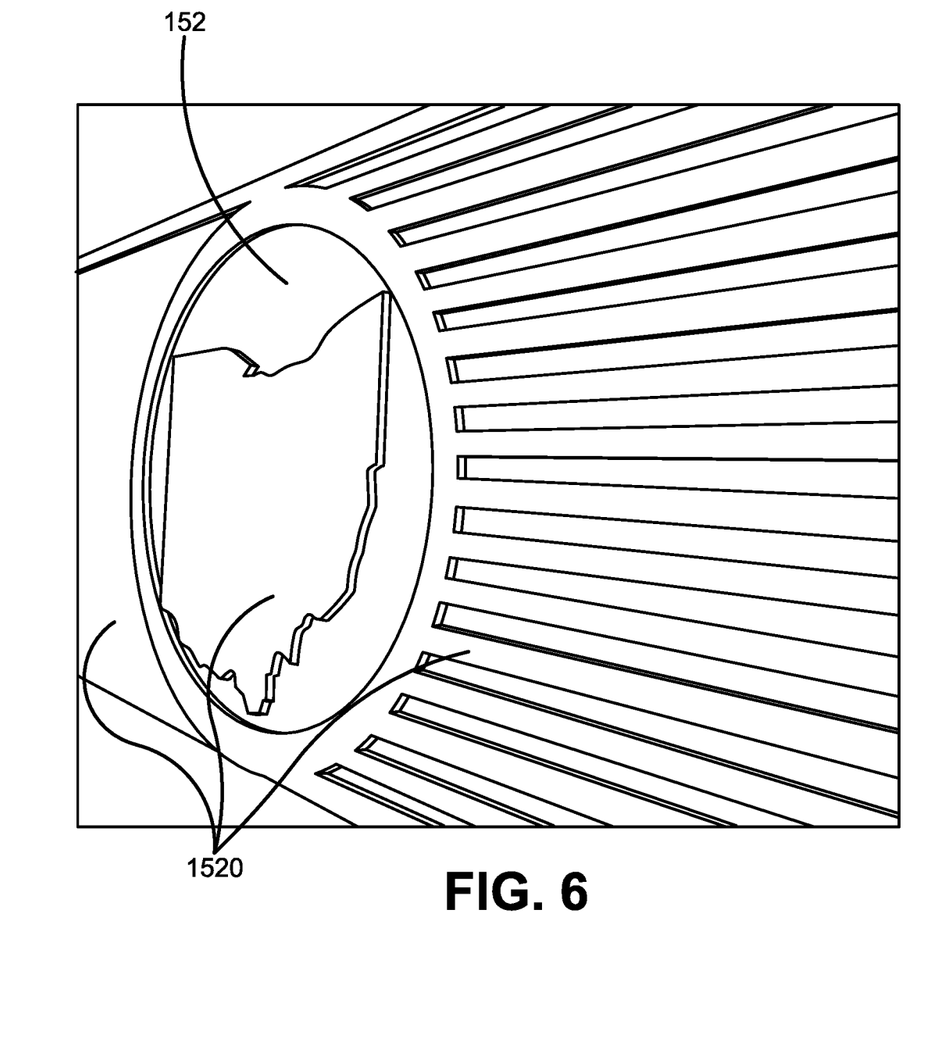
FIG. 6 provides a perspective view of one potential embodiment of a noise barrier wall panel of the present invention in accordance with the disclosed architecture.

Additional layers may then be applied over top of and affixed to the at least one sheathing 142 layer (as shown in FIG. 5) in the following procedural method. However, it should be noted that the first steps of the method include the assembling of the frame 120 and strapping 122 arrangement as described above, and also includes the attachment of insulation 140 and sheathing 142 to the frame 120. First, an air and weather barrier 146 may be applied to the entire sheathing area 142 or applied only to the outer perimeters of the panel 100 at the interchange or connection of the sheathing 142 and metal frame 120. Next, the entirety or select portions of the sheathing 142 may receive a layer of covering or surface coating 148 to spot and/or cover all exposed the cement board or sheathing 142 joints and screw and fastener heads. Then, a combined basecoat and layer of fiberglass mesh 150 can be applied to the entire surface area of the sheathing 142. Layer 150 can also be applied to the entirety or a portion of the metal frame 120 prior to the attachment of the sheathing 142 to the frame 120. Finally, a finish layer of acrylic coating 152 may be applied over the basecoat and mesh layer 150. The finish layer 152 may also have any variety and number of different colors, textures, architectural elements and designs, as well as multiple raised (e.g. 3-dimensional) finish layers 1520 that have differing colors, textures and designs, as seen in FIG. 6. In addition, the finish layer 152 may have an imprinted (e.g., stamped or embossed) or raised texture providing a tactile feature that mimics building materials or imagery such as but not limited to: brick, stone, wood, cement, stucco, tile, rock, natural materials, trees, bushes, hedges, mountains, hillsides, gardens, flowers and combinations thereof.

In a further embodiment of the panel 100, an insulation layer 140 may be applied between the air and weather barrier layer 146 and the base coat mesh layer 150, or any two layers of the panel 100 (and between the frame 120 and sheathing 142 as noted above). Further, the insulation 140 may be made of an extruded polystyrene or polyurethane foam. However, it will be appreciated that the insulation 140 may be made of any variety of suitable materials including, for example, foam insulation, plywood, drywall, water resistant board, light gauge sheet metal, and combinations thereof. It is also contemplated that the insulation layer 140 is sound-dampening or noise-reflective or absorptive, such that the panel 100 itself becomes sound reflective, dampening or sound-absorptive. It is further contemplated that in some embodiments, the panel 100 may reduce noise levels by five dB or more, and even by 10 dB or more in further embodiments. Further, the finish layer 152 may have a plurality of coatings such as an anti-graffiti coating, smog-reducing coating, sound absorption coating, etc. and may also include embedded solar panels or photovoltaic cells.

In differing embodiments, the panel 100 may also be anchored by any of a variety of suitable methods. In at least one embodiment, helical piles may be used for foundations, as well as a specialized I-Beams or posts, which may be configured to a particular design. In such embodiments, the helical pile or other anchoring method utilized may be sufficient to satisfy all Department of Transportation (DOT) requirements and/or those requirements corresponding to each state's specifications.

Figure 9:
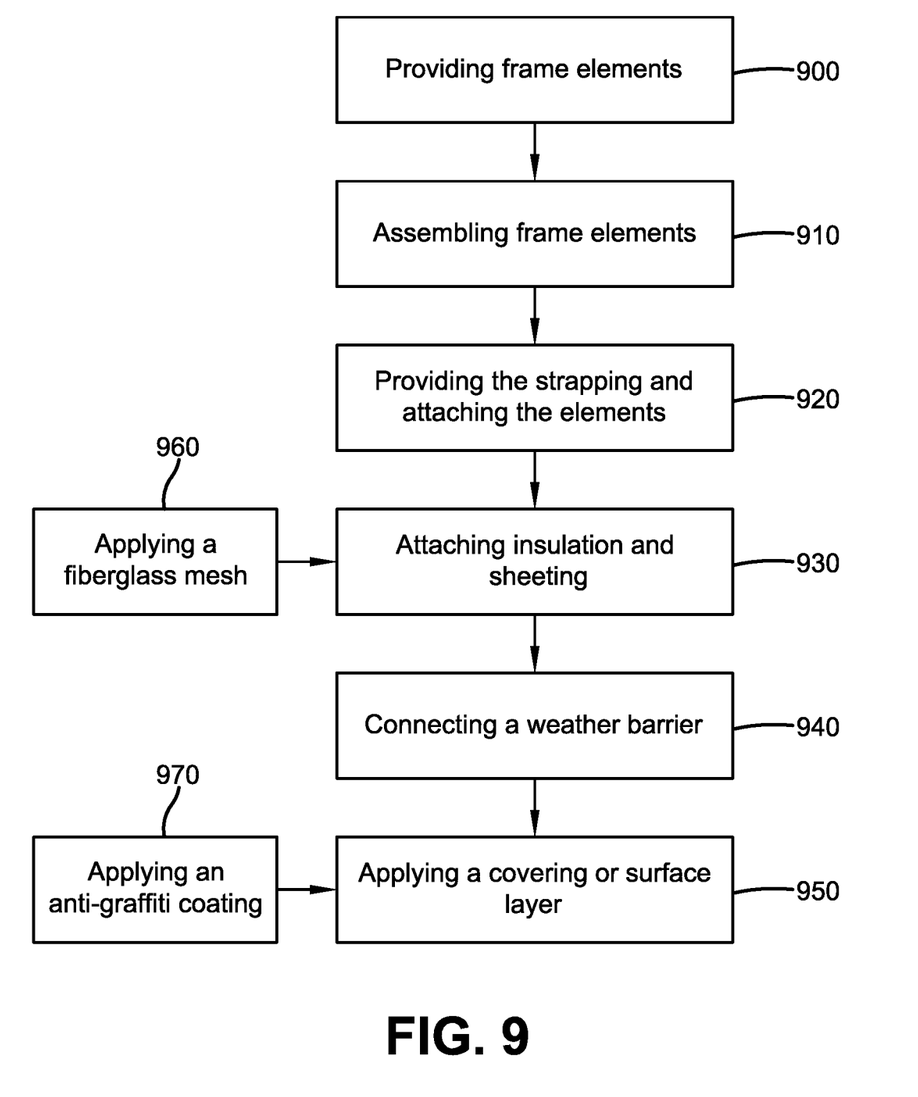
FIG. 9 is a block diagram showing an exemplary method of making a noise or sound barrier panel in accordance with the present invention.

FIG. 9 provides an exemplary flow diagram of an exemplary method for producing the sound or noise barrier material. The method includes initially providing frame elements at step 900, then assembling the frame elements at step 910. Next, the strapping elements are provided and attached at step 920. Insulation and sheeting are attached to the frame at step 930 and then a weather barrier is connected at step 940. A covering or surface layer may be provided over the assembled laminate at step 950. In additional steps, a fiberglass mesh may be applied over the laminate at step 960 and an anti-graffiti coating may be applied at step 970.

Figure 10A:
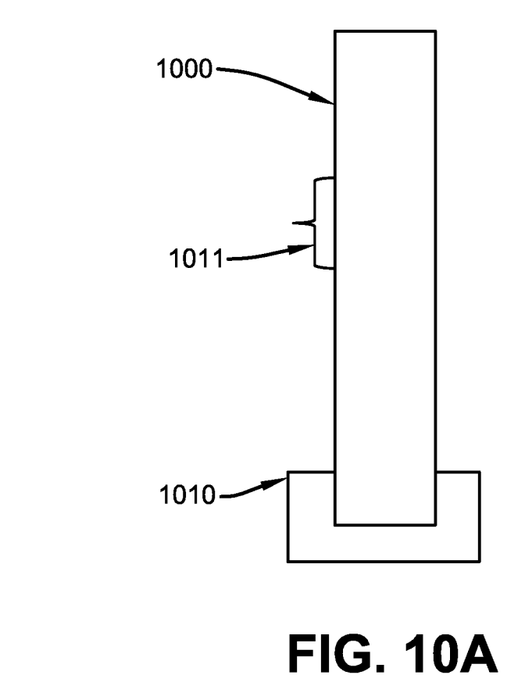
FIG. 10A shows a side view of an assembled wall in a supporting frame and multidimensional surface coverings.

FIG. 10A shows a side view of a sound barrier or noise abatement wall structure 1000 which is positioned in a U shaped channel 1010 to support the wall panels in an upright configuration. In addition, FIG. 10A also shows a tactile element 1011 on the surface layer which provides a three-dimensional attribute of the wall structure 1000.

Figure 10B:
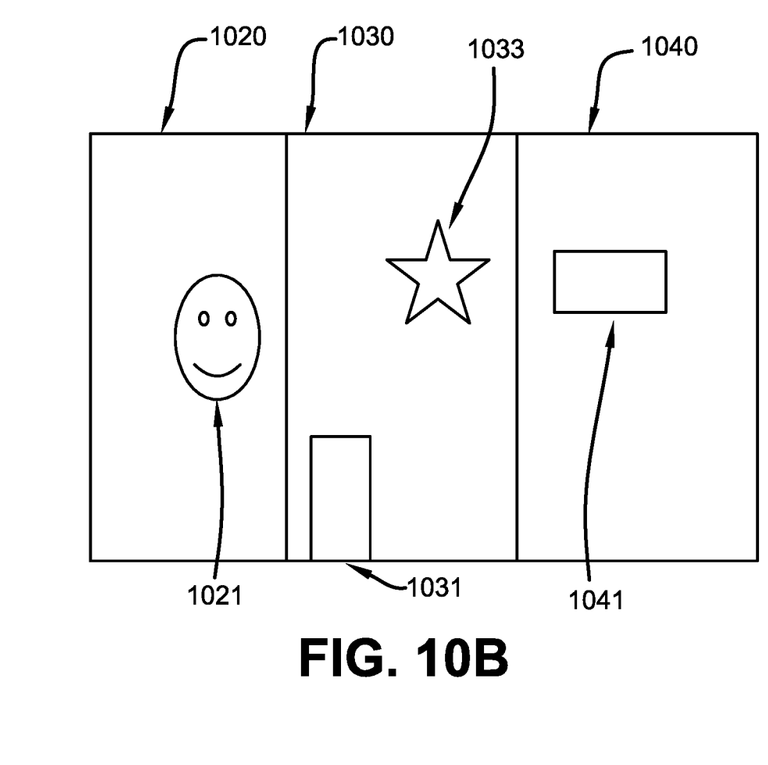
FIG. 10B provides a front view of a sound barrier wall showing different sized elements and components in accordance with the present invention.

FIG. 10B provides a front view of a sound dampening or noise reduction wall having different sized wall panels 1020, 1030 and 1040. Panel 1020 includes an aesthetic element 1021, while panel 1030 has a door 1031 and a design element 1033. Panel 1040 shows a window element 1041 which can be used to view through the wall panels.

While particular embodiments have been illustrated and described herein, it should be understood that various other changes and modifications may be made without departing from the spirit and scope of the subject matter. Moreover, although various aspects have been described herein, such aspects need not be utilized in combination. Certain terms are also used throughout the following description and claims to refer to particular features or components. As one skilled in the art will appreciate, different persons may refer to the same feature or component by different names. This document does not intend to distinguish between components or features that differ in name but not structure or function. As used herein "improved noise barrier wall panel", "noise barrier wall panel", and "panel", are interchangeable and refer to the improved noise barrier wall panel 100 of the present invention.

Notwithstanding the forgoing, the improved noise barrier wall panel 100 of the present invention and its various components can be of any suitable size and configuration as is known in the art without affecting the overall concept of the invention, provided that they accomplish the above-stated objectives. One of ordinary skill in the art will appreciate that the size, configuration and material of the improved noise barrier wall panel 100 as shown in the FIGS. are for illustrative purposes only, and that many other sizes and shapes of the improved noise barrier wall panel 100 are well within the scope of the present disclosure. Although the dimensions of the improved noise barrier wall panel 100 are important design parameters for user convenience, the improved noise barrier wall panel 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A noise abatement panel comprising:
   a rigid frame element comprising a plurality of vertical frame members and a plurality of horizontal frame members;
   a plurality of strapping elements, each strapping element including a first end and a second end;
   the first end of each one of at least a nonintersecting pair of the plurality of strapping elements secured to a front surface of one of the vertical frame members at a top corner of the rigid frame element;
   the second end of each one of at least the nonintersecting pair secured to a front surface of the lowest one of the horizontal frame members in a diagonal orientation;
   a cover layer having an aesthetic feature;
   a sheathing layer comprising cement board and interposing the cover layer and the frame; and
   the sheathing layer and cover layer forming a noise abatement panel laminate; and
   wherein the plurality of strapping elements are configured to strengthen the rigid frame element when under a non-vertical load; and
   wherein each strapping element is a single unitary piece further non-removably secured to a diagonal intersection of each of the horizontal frame members within the rigid frame element; and
   wherein the noise abatement panel is 8 lb/ft$^2$ or less in weight.

2. The noise abatement panel as recited in claim 1, wherein the rigid frame element is formed from a metal in accordance with ASTM 1003.

3. The noise abatement panel as recited in claim 1, wherein the aesthetic feature includes a tactile feature.

4. The noise abatement panel as recited in claim 3, wherein the tactile feature mimics a brick, a stone, a wood, a concrete, a stucco, a tile, a rock, a natural material or a combination thereof.

5. The noise abatement panel as recited in claim 3, wherein the tactile feature mimics a tree, a bush, a hedge, a mountain, a hillside, a garden, a flower or a combination thereof.

6. The noise abatement panel as recited in claim 1, wherein the cover layer includes an anti-graffiti coating.

7. The noise abatement panel as recited in claim 6, wherein the anti-graffiti coating is a silicone based material.

8. The noise abatement panel as recited in claim 1 further comprising a noise-reducing insulation layer, an air and weather barrier layer, a basecoat, and a mesh coating layer.

9. The noise abatement panel as recited in claim 8, wherein the mesh coating layer is comprised of a fiberglass.

10. The noise abatement panel as recited in claim 1, wherein the cover layer comprises an acrylic coating.

11. The noise abatement panel of claim 1, wherein:
    the plurality of vertical frame members comprises a pair of intermediate vertical frame members;
    the second end of each of at least the nonintersecting pair is secured to a front surface of a bottom portion of a corresponding one of the pair of intermediate vertical frame members.

12. A method of producing a sound barrier wall panel comprising the steps of:
    providing a plurality of frame elements formed from a cold rolled or cold formed steel in accordance with ASTM 1003, wherein each frame element comprises a plurality of vertical frame members and a plurality of horizontal frame members;
    assembling the plurality of frame elements;
    providing a plurality of strapping elements, each strapping element including a first end and a second end;
    the first end of each of at least a nonintersecting pair of the plurality of strapping elements secured to a front surface of one of the vertical frame members;
    the second end of each of at least the nonintersecting pair secured to a front surface of one of the horizontal frame members in a diagonal orientation through one or more fasteners;
    providing a sheathing layer, an insulation layer and a cover layer to form a laminate;
    attaching the laminate to the plurality of frame element using the plurality of strapping elements; and applying a weather barrier to only an outer perimeter of the sound barrier wall panel at a connection of the sheathing layer and the plurality of frame elements; and wherein the plurality of strapping elements are configured to strengthen each frame element when under a wind load; and wherein each strapping element is a single unitary piece further secured to a diagonal intersection of at least some of the horizontal frame members within each respective frame element; and wherein the sound barrier wall panel is eight lb/ft$^2$ or less in weight; and wherein each frame element is twenty four feet in length and either four or eight feet in height.

13. The method as recited in claim 12 comprising a further step of applying a fiberglass mesh after the step of providing a plurality of strapping elements.

14. The method as recited in claim 12 comprising a further step of applying an anti-graffiti coating after the step of attaching the laminate.

15. The method as recited in claim 12 comprising a further step of creating at least one opening in the laminate for at least one of a door or a window.

16. The method as recited in claim 12, wherein the cover layer comprises at least one tactile element or an aesthetic element.

17. The method as recited in claim 16, wherein the at least one tactile or aesthetic element mimics a building material.

18. A sound dampening wall comprising:
a supporting foundational element;
a plurality of wall panels, wherein each of the plurality of wall panels is formed from a laminate and is held together by a steel frame comprising a plurality of vertical frame members, a plurality of horizontal frame members, and a plurality of strapping elements, the plurality of strapping elements including a nonintersecting pair, wherein each strapping element includes a first end and a second end, the first end of each of at least a nonintersecting pair of the plurality of strapping elements secured to a front surface of the vertical frame member at a top corner of the steel frame and the second end of each of at least the nonintersecting pair secured to a front surface of a lowest of the horizontal frame members in a diagonal orientation through one or more fasteners;
an access opening frame provided in at least one of the plurality of wall panels; and
at least one of a tactile or aesthetic element provided on at least one of the plurality of wall panels; and
wherein the plurality of strapping elements are configured to strengthen the steel frame when under a non-vertical load; and
wherein the laminate is comprised of a sheathing layer, an insulation layer, a cover layer, an air and weather barrier layer, a basecoat and mesh coating layer; and
wherein each strapping element is a single unitary strap abutting a diagonal intersection of each of the horizontal frame members within each respective steel frame; and
wherein each wall panel is eight lb/ft$^2$ or less in weight; and
wherein each wall panel is configured to reduce a noise level by at least ten decibels; and
wherein the air and weather barrier is applied to only an outer perimeter of each panel at a connection between the sheathing layer and the respective steel frame.

19. The sound dampening wall as recited in claim 18 further comprising an anti-graffiti coating applied over the cover layer.

* * * * *